Figure 1:
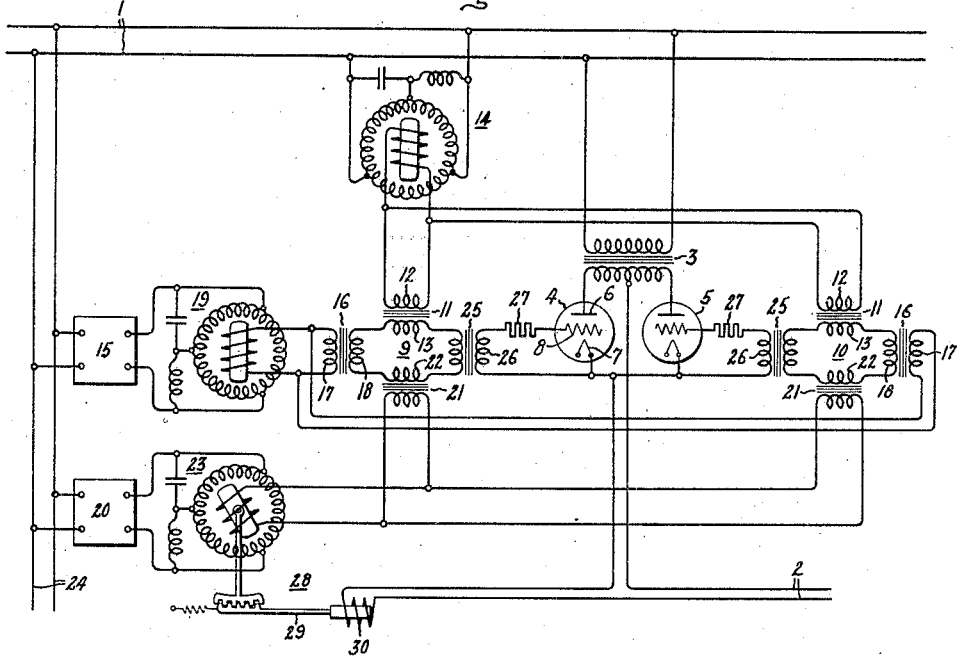

Nov. 15, 1938.    B. D. BEDFORD    2,137,126
ELECTRIC VALVE CIRCUIT
Filed April 25, 1936    3 Sheets-Sheet 1

Inventor:
Burnice D. Bedford
by Harry E. Dunham
His Attorney.

Patented Nov. 15, 1938

2,137,126

UNITED STATES PATENT OFFICE 2,137,126

ELECTRIC VALVE CIRCUIT

Burnice D. Bedford, Schenectady, N. Y., assignor to General Electric Company, a corporation of New York Application April 25, 1936, Serial No. 76,449

14 Claims. (Cl. 175—363)

My invention relates to electric valve translating circuits and more particularly to excitation circuits for electric valves.

It is frequently desirable to provide inexpensive arrangements for supplying periodic potentials having predetermined wave forms. In some instances it becomes desirable to provide electrical systems for supplying a plurality of alternating potentials of predetermined wave form and which have a predetermined phase rotation.

Coincidentally with the increasing use of electric valves in power translating apparatus, it has become evident that the apparatus employed in the associated control circuits must be susceptible of providing certain and reliable operation to assure reasonable continuity of service. There also has been evidenced a need for control or excitation circuits employing only apparatus of a rugged construction and which is suitable for operation over long periods of time without necessitating repairs or renewal of parts.

It is an object of my invention to provide an improved electric circuit for supplying a plurality of periodic voltages having a predetermined wave form and having a predetermined phase rotation.

It is another object of my invention to provide an improved electric valve translating circuit which meets the above mentioned requirements.

It is a further object of my invention to provide an improved excitation circuit for electric valve systems which employs only elements which are rugged in construction and which are suitable for long periods of uninterrupted service.

It is a still further object of my invention to provide a new and improved control circuit for electric valve translating circuits for supplying control voltages of suitable wave form and by means of which electrical conditions of associated electric circuits may be controlled without employing expensive and complicated equipment.

In accordance with the illustrated embodiments of my invention, I provide a control circuit for supplying a voltage of suitable wave form to the control member of an electric valve, which control circuit employs only parts susceptible of reliable operation and suitable for long periods of uninterrupted service. To provide a voltage of peaked wave form, I employ means for supplying alternating potentials of fundamental frequency and harmonic frequencies such as a source of fundamental frequency and sources of alternating potentials of a frequency, or frequencies, corresponding to a multiple, or multiples, of the fundamental frequency. The phase relationships of the various potentials are adjusted so that the resultant periodic potential has a positive portion of peaked wave form and a negative or biasing portion of substantially greater duration than that of the position portion. In order to control the phase of the resultant periodic potential impressed on the control members relative to the potential appearing between the anode and cathode of a valve, the phase of the fundamental and harmonic potentials may be varied relative to the potential impressed on the anode of the electric valve or the phase of the harmonic potentials may be varied relative to each other or relative to the potential of fundamental frequency. By controlling the phase relationship among these potentials in accordance with an electrical condition of an associated circuit to be controlled, the resultant potential impressed on the control member is controlled in phase to effect control of the electric valve means.

Figure 2:
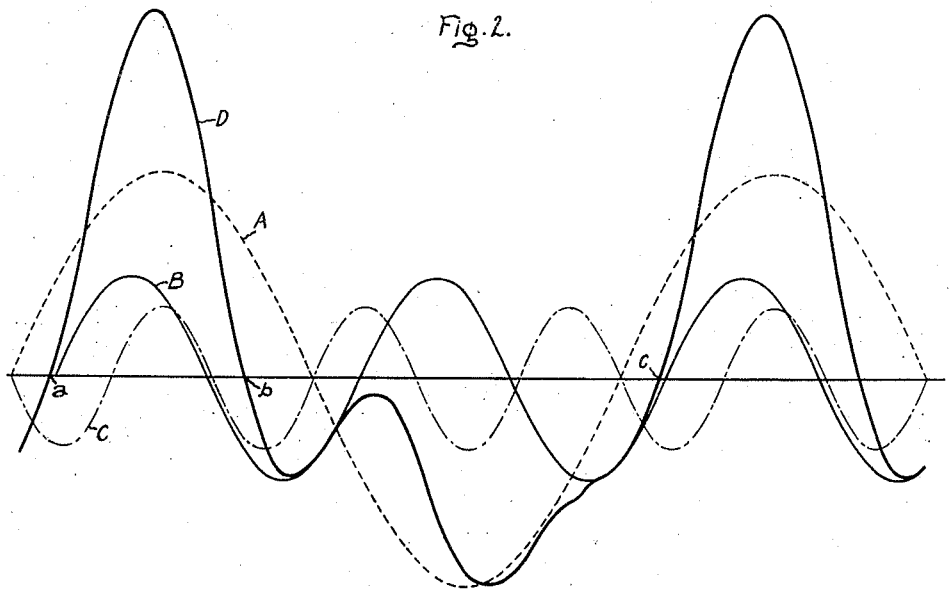
Figure 3:
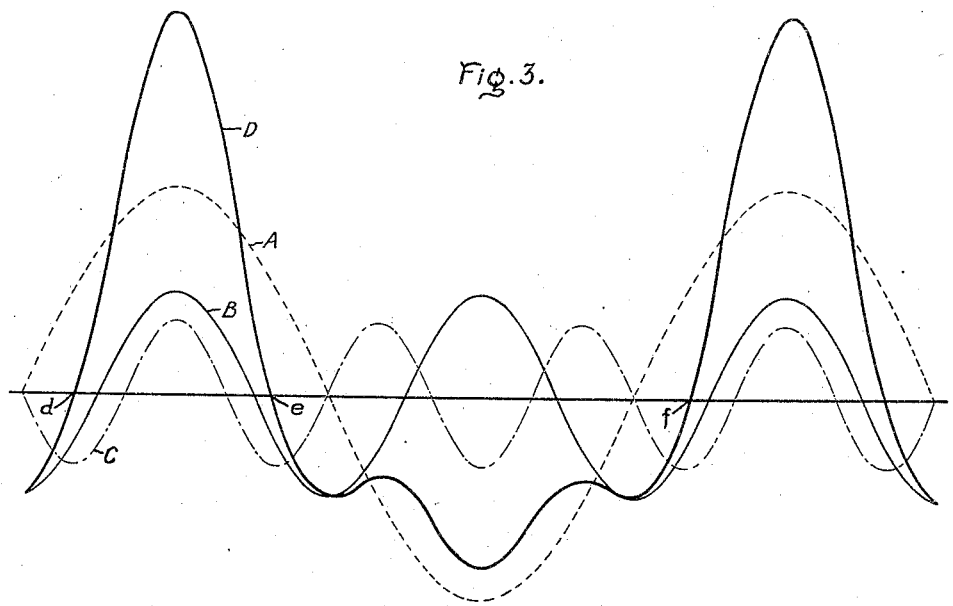
Figure 4:
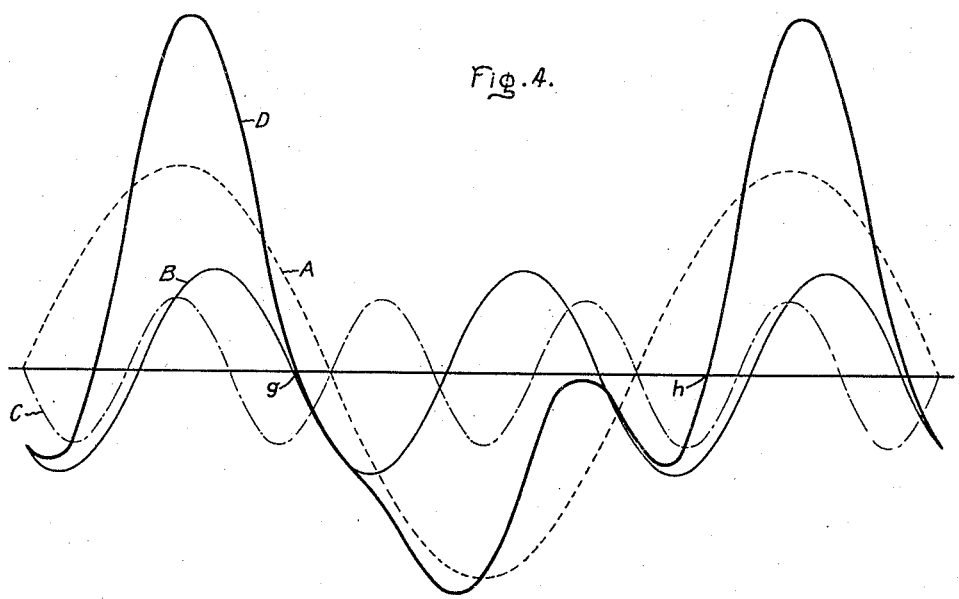
Figure 5:
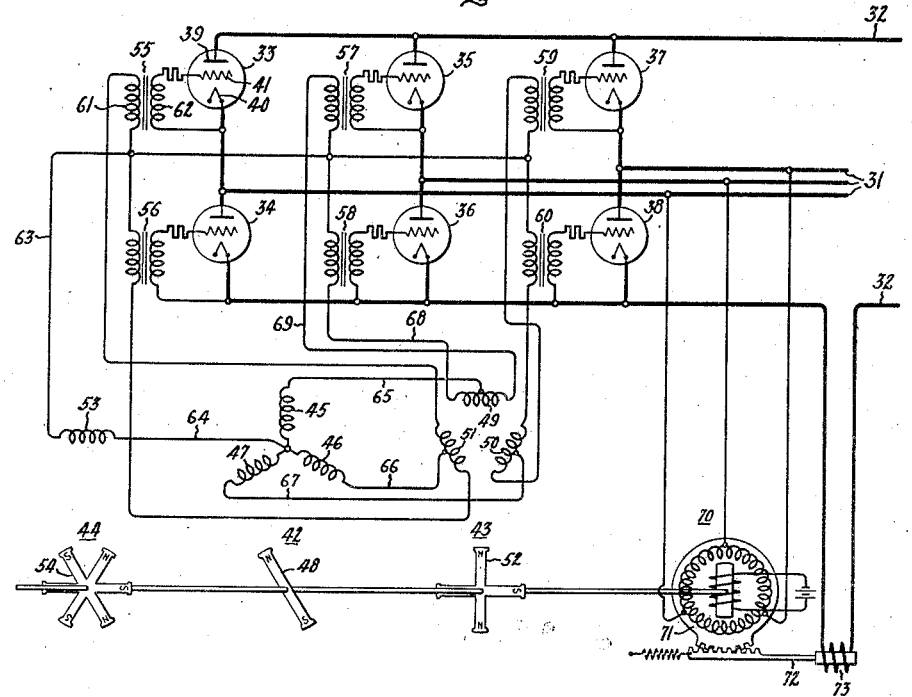

For a better understanding of my invention, reference may be had to the following description taken in connection with the accompanying drawings, and its scope will be pointed out in the appended claims. Fig. 1 of the accompanying drawings diagrammatically illustrates an embodiment of my invention as applied to an electric valve translating circuit, while Figs. 2, 3, and 4 show certain operating characteristics of the control circuit shown in the embodiment of my invention in Fig. 1; Fig. 5 diagrammatically represents my invention as applied to a polyphase electric valve translating circuit for transmitting energy between a three-phase alternating current circuit and a direct current circuit.

Referring now to Fig. 1 of the accompanying drawings, there is diagrammatically represented an embodiment of my invention as applied to an electric valve translating circuit for transmitting energy between an alternating current circuit and a direct current circuit. The alternating current circuit 1 is associated with the direct current circuit 2 through electric translating apparatus including a transformer 3 and electric valve means, such as individual electronic discharge devices 4 and 5 preferably of the type employing ionizable mediums such as gases or vapors. Each of the electronic discharge devices 4 and 5 furnishes an arc discharge path and is provided with an anode 6, a cathode 7 and a control member 8. In order to control the conductivity of the electric valves 4 and 5, I employ individual excitation circuits 9 and 10 which are associated with electronic discharge devices 4 and 5, respectively. The excitation circuits 9 and 10 are arranged to impress on the respective control members 8 of electronic discharge devices 4 and 5 suitable periodic control voltages having positive portions of peaked wave form and negative or biasing portions of substantially greater duration than the duration of the positive portions.

To introduce into the respective excitation circuits 9 and 10 an alternating potential of a fundamental or reference frequency, I employ transformers 11 each having a primary winding 12 and a secondary winding 13. The transformers 11 may be energized from any suitable source of alternating potential. In the arrangement diagrammatically shown in Fig. 1, the transformers 11 are energized from the alternating current circuit 1 through any conventional phase shifting arrangement such as the rotary phase shifting device 14. To introduce into the respective excitation circuits 9 and 10 alternating potentials having a component or harmonic potential corresponding to an odd multiple of the frequency of the fundamental component, I employ any conventional harmonic generator diagrammatically shown as element 15 of the drawing. This generator may be of any of the arrangements now well known in the art, such as magnetic frequency multiplication means which are reliable in operation and susceptible of long periods of uninterrupted service. This harmonic potential is introduced into the excitation circuits 9 and 10 by means of transformers 16 each having a primary winding 17 and a secondary winding 18 through any conventional phase shifting arrangement such as the rotary phase shifting device 19. For the purpose of explaining my invention, it may be assumed that the harmonic generator 15 furnishes an alternating potential having a frequency which is three times the frequency of the fundamental potential. To introduce into the excitation circuits 9 and 10 a potential having a component corresponding to an even multiple of the fundamental frequency such as a second harmonic of the potential of fundamental frequency, I employ any conventional harmonic generator 20 which also may be any of the types well known in the art such as, for example, a magnetic frequency multiplication type. This second harmonic potential is introduced into the excitation circuits 9 and 10 by means of transformers 21 having secondary windings 22 through any conventional phase shifting arrangement such as the rotary phase shifting device 23. Although in Fig. 1 the harmonic generators 15 and 20 are shown as being energized from the alternating current circuit 1 through conductors 24, it should be understood that I may employ any other suitable source of potential.

In order to impress on the control members 8 of electronic discharge devices 4 and 5 potentials which are the resultants of the fundamental and the harmonic potentials, I employ transformers 25 having secondary windings 26. Current limiting resistances 27 are connected in series with the secondary windings 26 of transformers 25.

Where it is desirable to control the electric valve translating circuit in accordance with an electrical condition of an associated supply or load circuit, the resultant potential impressed on the control members 8 of electric valves 4 and 5 may be varied in phase relative to the potential appearing between the respective anodes and cathodes of these valves by controlling the phase relationship between the respective harmonic potentials or the phase relationship among the fundamental potential and the several harmonic potentials. In the diagrammatic representation of my invention shown in Fig. 1, I have shown one way in which this control may be accomplished. A current responsive means, such as a control arrangement 28, is associated with the rotary phase shifter 23 to control the phase of the second harmonic potential in accordance with an electrical condition such as the current of the load circuit 2. The arrangement 28 is provided with a spring biased plunger 29 which is acted upon by a current responsive coil or actuating element 30, which controls the angular position of the rotary member of the phase shifter 23 and hence controls the phase of the second harmonic potential.

The general principles of operation of the embodiment of my invention diagrammatically shown in Fig. 1 may be explained by considering the operation of the electric valve translating circuit when energy is being transferred from the alternating current circuit 1 to the direct current load circuit 2. In the manner well understood by those skilled in the art, the electronic discharge devices 4 and 5 will alternately supply unidirectional current to the load circuit 2. It will also be understood that the voltage of the direct current circuit 2 and hence the average current supplied to this circuit may be controlled by controlling the phase of the potentials impressed on the respective control members of electronic discharge devices 4 and 5. When there is substantial phase coincidence between the potentials impressed on the control members 8 and the voltage appearing between the associated anodes 6 and cathodes 7, the voltage impressed on the load circuit 2 by the electric valve aggregate will be maximum. Furthermore, it will be understood that as the potentials impressed on the control members 8 of electronic discharge devices 4 and 5 are retarded in phase relative to the anode-cathode potentials, the voltage and hence the average current supplied to the direct current circuit 2 will be decreased. Conversely, the voltage impressed on direct current circuit 2 may be increased by advancing the phase of the potentials impressed on the respective control members 8.

Where the electronic discharge devices 4 and 5 are of the gaseous type, it has been found desirable to control these devices by impressing on the associated control members voltages of substantially peaked wave form to initiate the electrical discharge at predetermined times during each cycle of anode-cathode potential in order to obtain the desired precision and reliability of control necessary for satisfactory operation. After the arc has been established, it has also been found desirable to impress on the control member a potential which is negative relative to the cathode so that this potential will be effective to deionize the electric valve when the electric valve has completed its normal predetermined period of conduction.

The operation of the excitation circuits 9 and 10 shown in Fig. 1 may be explained by considering the operating characteristics represented in Fig. 2 where the curve A represents the alternating potential of fundamental frequency introduced into the excitation circuits 9 and 10 by transformers 11; curve B represents the second harmonic potential introduced into the excitation circuits 9 and 10 by transformers 21, and curve C represents the third harmonic potential introduced into the excitation circuits by means of transformers 16. The heavy curve D represents the resultant potential appearing across the terminals of secondary windings 26 of transformer 25. In order to obtain the desired wave form of the resultant potential, the rotary phase shifter 19 may be adjusted so that the third harmonic potential introduced into the excitation circuits 9 and 10 has the phase relationship shown by curve C, and the rotary phase shifter 23 may be adjusted so that the second harmonic potential introduced into the excitation circuit has phase position shown by curve B in Fig. 2. It will be noted that the curve D of the resultant potential becomes positive at time $a$ and if the electronic discharge devices 4 and 5 have a substantially zero characteristic the electric valves will be rendered conductive at times corresponding to this point. At time $b$ the resultant potential represented by curve D has decreased to zero. During the interval $a$—$b$, the resultant potential is of a substantially peaked wave form having a substantially perpendicular wave front. During the interval $b$—$c$ the resultant potential represented by the curve D is negative. It should be further noted that the interval $b$—$c$ is substantially greater than the interval $a$—$b$ and is substantially greater than 180 electrical degrees, which condition is highly desirable in control of electric valves of the gaseous type.

If it is desired to effect a decrease in the voltage impressed on the load circuit 2 upon increase in load current, the phase of the second harmonic potential represented by curve B may be retarded in phase to the position indicated in the operating characteristics shown in Fig. 3. By virtue of the retardation in phase of the second harmonic potential, the resultant potential as represented by curve D will also have been retarded in phase relative to the fundamental potential A. This, of course, will effect a retardation in the phase of the resultant potential impressed on the control members of electronic discharge devices 4 and 5 to the position corresponding to point $d$ and will cause a decrease in the voltage impressed on the direct current circuit 2 by these devices. Referring to the operating characteristics of Fig. 3, it will be noted that the desirable positive portion of peaked wave form of the resultant potential during the interval $d$—$e$ is maintained and the negative portion $e$—$f$ of the resultant potential is also of satisfactory proportion. If a still further decrease in voltage is required, the phase of the second harmonic potential represented by curve D may be still further retarded to the position shown in Fig. 4. While the wave form of the negative portion $g$—$h$ of the resultant potential represented by curve D in Fig. 4 is rather irregular, it nevertheless is of suitable proportion to furnish the desirable negative biasing voltage.

If it is desired to provide a control system which furnishes a rising voltage or current characteristic in the load circuit 2 upon increase of load current in this circuit, the phase position of the rotary phase shifter 23 may be adjusted initially to introduce into the excitation circuit a second harmonic potential having a phase position corresponding to that shown in Fig. 4. Upon increase in current, the phase of the second harmonic potential may be advanced by means of the angular positioning arrangement 28 to advance the phase of the resultant potential represented by curve D to the positions shown in Figs. 3 and 2, thereby effecting an advancement in the phase of the resultant potential impressed on control members 8 of electronic discharge devices 4 and 5 to increase the voltage impressed on the direct current circuit 2 and also to increase the average current supplied to this circuit. It should also be understood that the rotary phase shifter 23 and the angular positioning arrangement 28 may be adjusted to maintain constant current or constant voltage in the load circuit 2.

In Fig. 5 of the accompanying drawings, my invention is diagrammatically represented as applied to a polyphase electric valve translating circuit for transmitting energy between a three phase alternating current circuit 31 and a direct current circuit 32. Electric valves 33—38, inclusive, preferably of the type employing ionizable mediums such as gases or vapors, are employed to interconnect the alternating current circuit 31 and the direct current circuit 32. The valves 33—38, inclusive, each comprise an anode 39, a cathode 40, and a control member 41.

In order to impress upon the respective control members 41 of electric valves 33—38 a voltage having positive portions substantially less than 180 electrical degrees in duration, I employ an arrangement including a plurality of sources of alternating potential such as generators 42, 43, and 44. The generator 42, which is employed as a source of potential of fundamental frequency, includes a group of armature phase windings 45, 46, and 47 and a rotating field member 48. The generator 43, which is employed as a source of potential of double frequency relative to the potential of fundamental frequency, includes a group of armature phase windings 49, 50 and 51 and a rotating field member 52. Generator 44 includes an armature winding 53 and a rotating field member 54 and supplies a potential of triple frequency relative to the fundamental potential. Although the generators 42—44, inclusive, have been shown as generators employing stationary armature windings and rotating field windings, it is to be noted that these generators may be of any conventional type in which the respective generators are separately arranged or combined in one structure. For example, a plurality of generators may be driven by a common driving means or the generators may be driven by separate means. Under some circumstances it may be desirable to employ generators having the same number of poles and to drive the generators at different speeds from a common driving means through suitable speed modification apparatus.

To impress upon the various control members 41 of electric valves 33—38 potentials which are the resultants of the potentials of armature windings of generators 42—44, I use transformers 55—60, inclusive, having primary windings 61 and secondary windings 62. The left-hand terminal of armature winding 53 of generator 44 is connected to the primary windings 61 of transformers 55—60 through a conductor 63 and the right-hand terminal of winding 53 is connected to the electrical neutral of the armature windings 45—47 of generator 42 through a conductor 64. Armature windings 45—47 of generator 42 are connected to electrical mid-connections of armature windings 49, 51 and 50 through conductors 65, 66 and 67, respectively. In this manner, the phase windings of generators 42 and 43 are interconnected so that the phase rotations of the potentials of these generators are opposite relative to each other. The left-hand terminal of armature winding 49 of generator 43 is connected to primary winding 61 of transformer 58 associated with electric valve 36 through a conductor 68, and the right-hand terminal of armature winding 49 is connected to the primary winding 61 of transformer 57 associated with electric valve 35 through a conductor 69. In a similar manner, armature windings 50 and 51 are associated with transformers 59, 60 and transformers 55, 56, respectively.

A synchronous motor 70 having a stator member 71 is energized from the alternating current circuit 31 and is employed to drive the rotating field members 48, 52 and 54 of generators 42, 43 and 44, respectively. Any load responsive means, such as a spring-biased plunger 72 and an actuating winding 73, may be employed to control the angular position of the rotating members 48, 52 and 54 relative to the potential of the alternating current circuit 31. In the arrangement diagrammatically shown in Fig. 5, the spring-biased plunger 72 and the associated actuating winding 33 are arranged to control the angular position of the stator member in accordance with an electrical condition such as the current of the direct current circuit 32. It is to be noted that any other manual or automatic phase adjusting or controlling means may be employed and that these means may be made responsive to electrical conditions or combinations of electrical conditions of the direct current circuit 32 and the alternating current circuit 31.

The general principles of operation of the embodiment of my invention diagrammatically shown in Fig. 5 may be best explained by considering the electric valve aggregate including electric valves 33—38 when energy is being transferred from the direct current circuit 32 to the alternating current circuit 31. The manner in which the electric valves 33—38 operate to supply three phase alternating current to the alternating current circuit 31 will be well understood by those skilled in the art. It is also understood that in polyphase electric valve inverter circuits of this nature, it is highly desirable to impress upon the control members of the associated electric valves periodic potentials which have positive portions substantially less than 180 electrical degrees in duration and which have negative portions substantially greater than 180 electrical degrees. In the three phase inverter circuit, as shown in Fig. 5, it has been found desirable to provide voltages having positive portions extending for substantially 120 electrical degrees. The control or excitation circuit shown in Fig. 5 provides potentials having this type of wave form and employs only apparatus of simple and rugged construction.

The phase windings of the generators 42, 43, and 44 are connected by conductors 64—67, inclusive, and are correlated in phase to provide a plurality of sources of alternating potential of peaked wave form. The maximum values of the various potentials occur in a predetermined order at predetermined electrical intervals. Each of the electric valves conducts for 120 electrical degrees during each cycle of alternating potential of circuit 31. As is well understood by those skilled in the art, in a three phase circuit of the type shown in Fig. 5, each valve conducts for only 60 electrical degrees with any one of the oppositely disposed electric valves. For example, valves 33 and 36 will be conductive during one sixty electrical degree period, and during the following sixty electrical degree interval electrical valves 33 and 38 will be conductive. Therefore, I provide a plurality of sources of alternating potential of suitable wave form and phase relationship so that these valves may be rendered conductive in a predetermined order and so that each valve may be maintained conductive for the predetermined normal period of conduction. By virtue of the interconnection of the phase windings of generators 42—44, potentials of peaked wave form are impressed on the primary windings 61 of transformers 55—60. These potentials, in the particular arrangement shown, are arranged so that the maximum values of the peaked voltages occur in a predetermined order at 60 electrical degree intervals. Although the circuit arrangement of Fig. 5 shows a three phase electrical valve inverter, it is to be noted that by the proper choice of the phases of the generators, my invention may be equally well applied to electric valve translating circuits of any number of phases.

For the purpose of explaining the arrangement shown in Fig. 5, let it be assumed that the rotating field members 48, 52 and 54 are arranged so that the voltages of field windings of generators 42, 53, and 44 have the relative phase positions shown by curves A, B and C of Fig. 3.

In this manner, the potentials impressed upon the control members 41 of each of electric valves 33—38, inclusive, will have a wave form corresponding to curve D of Fig. 3 and the potentials impressed on the various control members are correlated in phase so that the electric valves conduct in a predetermined sequence, each valve conducting for substantially 120 electrical degrees during each cycle of alternating potential. During the remaining 240 electrical degrees of each cycle, each electric valve will be maintained nonconductive by the negative portion of the periodic potential impressed upon the control member 41.

By virtue of the synchronous motor 70 and the associated spring-biased plunger 72 and actuating winding 73, an electrical condition such as the voltage of the alternating current circuit 31 is controlled in accordance with an electrical condition such as the current of the direct current circuit 32. For example, the phase of the potentials impressed upon the control members 41 of electric valves 33—38, inclusive, may be advanced or retarded relative to the potentials impressed upon the respective anodes in accordance with the load current of the direct current circuit 32. It is to be noted that with this arrangement the wave form of the potential represented by curve D of Fig. 3 remains unaltered and that the voltage is advanced or retarded relative to the potential impressed upon the associated anode.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an electric valve means including a control member, and an excitation circuit comprising a source of alternating potential, a source of potential having a component corresponding to an even multiple of the frequency of said first mentioned source and a source of a potential having a component corresponding to an odd multiple of the frequency of said first-mentioned source, said sources being connected to impress on said control member a periodic potential having portions of one polarity substantially shorter in duration relative to the portions of opposite polarity.

2. In combination, an electric valve means including a control member, and an excitation circuit comprising a source of alternating potential, a source of potential having a component corresponding to an even multiple of the frequency of said first-mentioned source and a source of potential having a component corresponding to an odd multiple of the frequency of said first-mentioned source, said sources being connected to impress on said control member a periodic potential having positive portions substantially shorter in duration relative to the negative portions.

3. In combination, an electric valve means including a control member, and an excitation circuit for said electric valve means comprising a source of potential of fundamental frequency, a source of potential having a component corresponding to an even multiple of the frequency of said first-mentioned source, a source of potential having a component corresponding to an odd multiple of the frequency of said first-mentioned source and means responsive to the potentials of said sources for providing a resultant alternating potential having positive portions substantially shorter in duration relative to the negative portions.

4. In combination, an electric valve means including a control member, and an excitation circuit comprising a source of potential of fundamental frequency, a source of potential having a component corresponding to an odd multiple of the frequency of said source and a source of potential having a component corresponding to an even multiple of the frequency of said first-mentioned source, said sources being connected to impress on said control member a resultant alternating potential having positive portions substantially shorter in duration relative to the negative portions.

5. In combination, an electric valve means having a control member, and an excitation circuit comprising a source of potential of fundamental frequency, a source of potential of a frequency equal to the second harmonic of the frequency of said first-mentioned source, a source of potential of a frequency equal to the third harmonic of the frequency of said first-mentioned source and means responsive to the potentials of said sources for impressing on said control member a periodic potential having positive portions substantially less than 180 electrical degrees duration.

6. In combination, an electric valve means including a control member, an excitation circuit comprising a source of potential of fundamental frequency, a source of alternating potential of a frequency corresponding to an even multiple of the frequency of said first-mentioned source, a source of alternating potential of a frequency corresponding to an odd multiple of the frequency of said first-mentioned source, said sources being connected to impress on said control member a periodic potential of peaked wave form, and means for controlling the phase of the potential of said second-mentioned source to control said periodic potential.

7. In combination, an electric valve means having a control member, and an excitation circuit comprising a source of potential of fundamental frequency, a source of potential of a frequency corresponding to an even multiple of the frequency of said first-mentioned source, a source of potential of a frequency corresponding to an odd multiple of the frequency of said first-mentioned source, means for controlling the relative phase positions of said potentials to provide a resultant periodic potential having positive portions of peaked wave form and negative portions of substantially greater duration than said positive portions, and means for impressing said periodic potential on said control member.

8. In combination, an electric valve means including a control member, an excitation circuit comprising a source of potential of fundamental frequency, a source of alternating potential of a frequency double the frequency of said first-mentioned source, a source of alternating potential of a frequency triple the frequency of said first-mentioned source, said sources being arranged to impress on said control member a periodic potential having positive portions of peaked wave form and negative portions of substantially greater duration than said positive portions, and means for controlling the potentials of said sources to control said periodic potential.

9. In combination, a supply circuit, a load circuit, electric translating apparatus interconnecting said circuits including electric valve means having a control member, and an excitation circuit comprising a source of alternating potential, a source of potential of a frequency corresponding to an even multiple of the frequency of said first-mentioned source and a source of potential corresponding to an odd multiple of the frequency of said first-mentioned source, said sources being correlated in phase relationship to impress on said control member a voltage of peaked wave form.

10. In combination, a supply circuit, a load circuit, electric translating apparatus interconnecting said circuits including electric valve means having a control member, and an excitation circuit comprising a source of alternating potential, a source of potential of a frequency corresponding to an even multiple of the frequency of said first-mentioned source and a source of potential corresponding to an odd multiple of the frequency of said first-mentioned source, said sources being arranged to impress on said control member a periodic voltage having positive portions of peaked wave form and negative portions of substantially greater duration than said positive portions.

11. In combination, an alternating current circuit, a direct current circuit, electric translating apparatus interconnecting said circuits including an electric valve means providing an arc discharge path and a control member for controlling the initiation of an electrical discharge in said arc path, and an excitation circuit for controlling the time when said valve is rendered conductive relative to the potential of said alternating current circuit comprising a source of alternating potential, a source of potential of a frequency double the frequency of said first-mentioned source, a source of potential of a frequency triple the frequency of said first-mentioned source and means for controlling the phase of the potential of the double frequency source in accordance with an electrical condition of said load circuit to effect control of the potential impressed on said control member by said excitation circuit.

12. In combination, an alternating current circuit, a direct current circuit, electric translating apparatus interconnecting said circuits including electric valve means having a control member for controlling the initiation of an electrical discharge of said electric valve means, and an excitation circuit for controlling the time of initiation of said electrical discharge relative to the potential of said alternating current circuit in accordance with an electrical condition of said direct current circuit comprising a source of alternating potential of fundamental frequency, means for adjusting the phase of said source relative to the phase of the potential of said alternating current circuit, a second source of alternating potential of a frequency corresponding to an odd multiple of said first-mentioned source, a third source of alternating potential of a frequency corresponding to an even multiple of said first-mentioned source and means for controlling the phase of the potential of said third source relative to the potential of said first-mentioned source to effect control of the potential impressed on said control member.

13. In combination, a polyphase source of potential of fundamental frequency including a group of electrically displaced phase windings, a polyphase source of potential of a frequency corresponding to an even multiple of the frequency of said first-mentioned source including a group of electrically displaced phase windings, a source of alternating potential of a frequency corresponding to an odd multiple of the frequency of said first-mentioned source including a phase winding, and means for interconnecting said phase windings to provide a plurality of alternating current circuits having potentials of peaked wave forms, said phase windings being correlated in electrical displacement so that the maximum values of said peaked wave forms occur in a predetermined order at predetermined electrical intervals.

14. In combination, a polyphase alternating current circuit, a direct current circuit, electric translating apparatus interconnecting said circuits including a plurality of electric valve means, and a plurality of excitation circuits each associated with a different one of said electric valve means for rendering said electric valve means conductive in a predetermined order comprising a polyphase source of potential of fundamental frequency including a group of electrically displaced phase windings, a polyphase source of potential of a frequency corresponding to an even multiple of the frequency of said first-mentioned source including a group of electrically displaced phase windings, a source of potential of a frequency corresponding to an odd multiple of the frequency of said phase first-mentioned source including a phase winding and means for interconnecting said phase windings to provide a plurality of alternating current circuits having potentials of peaked wave forms, said phase windings being electrically displaced so that the maximum values of said peaked wave forms occur in a predetermined order at predetermined electrical intervals.

BURNICE D. BEDFORD.